(12) United States Patent
Philippe

(10) Patent No.: US 11,451,777 B2
(45) Date of Patent: Sep. 20, 2022

(54) METHOD FOR ENCODING A DIGITAL IMAGE, DECODING METHOD, DEVICES, AND ASSOCIATED COMPUTER PROGRAMS

(71) Applicant: B<>COM, Cesson Sevigne (FR)

(72) Inventor: Pierrick Philippe, Melesse (FR)

(73) Assignee: B<>COM, Cesson Sevigne (FR)

( * ) Notice: Subject to any disclaimer, the term of this patent is extended or adjusted under 35 U.S.C. 154(b) by 0 days.

(21) Appl. No.: 17/147,833

(22) Filed: Jan. 13, 2021

(65) Prior Publication Data

US 2021/0136382 A1 May 6, 2021

Related U.S. Application Data

(63) Continuation of application No. 15/740,198, filed as application No. PCT/FR2016/051456 on Jun. 16, 2016, now Pat. No. 10,924,737.

(30) Foreign Application Priority Data

Jun. 29, 2015 (FR) ...................................... 1556016

(51) Int. Cl.
*H04N 19/124* (2014.01)
*H04N 19/12* (2014.01)
(Continued)

(52) U.S. Cl.
CPC .......... *H04N 19/124* (2014.11); *H04N 19/12* (2014.11); *H04N 19/14* (2014.11); *H04N 19/176* (2014.11);
(Continued)

(58) Field of Classification Search
None
See application file for complete search history.

(56) References Cited

U.S. PATENT DOCUMENTS

2010/0208802 A1 8/2010 Tsukuba et al.
2011/0150072 A1 6/2011 Han
(Continued)

OTHER PUBLICATIONS

Arrufat et al., "Rate-distortion optimized transform competition for intra coding in HEVC," 2814 IEEE Visual Communications and Image Processing Conference, IEEE, Dec. 7, 2014 (2014-12-87), p. 73-76, XP 832741256.*

(Continued)

*Primary Examiner* — Edemio Navas, Jr.
(74) *Attorney, Agent, or Firm* — David D. Brush; Westman, Champlin & Koehler, P.A.

(57) ABSTRACT

Encoding a digital image divided into a plurality of blocks of pixels processed in a defined order, including the following steps, implemented for a current block, with preset sizes: predicting values of the current block from at least one block previously processed; calculating a residual block by subtracting the predicted values from the original values of the current block; obtaining a residual block by applying a transform to pixels of the residual block, said transformed residual block comprising coefficients; encoding the transformed residual block; calculating at least one characteristic representative of at least one transformed residual coefficient of the current block; determining initial identification data representative of a sub-list of at least one transform associated with said at least one calculated characteristic; and verifying that the transform applied to the current block is part of the sub-list identified by the initial data.

10 Claims, 8 Drawing Sheets

(51) Int. Cl.
  *H04N 19/14*    (2014.01)
  *H04N 19/176*   (2014.01)
  *H04N 19/18*    (2014.01)
  *H04N 19/463*   (2014.01)
  *H04N 19/61*    (2014.01)
  *H04N 19/625*   (2014.01)

(52) U.S. Cl.
  CPC ........... *H04N 19/18* (2014.11); *H04N 19/463* (2014.11); *H04N 19/61* (2014.11); *H04N 19/625* (2014.11)

(56) References Cited

U.S. PATENT DOCUMENTS

| | | | |
|---|---|---|---|
| 2012/0147955 A1 | 6/2012 | Budagavi | |
| 2014/0362926 A1* | 12/2014 | Rosewarne | H04N 19/129 375/240.18 |
| 2015/0381993 A1 | 12/2015 | Lim | |
| 2016/0219290 A1 | 7/2016 | Zhao et al. | |

OTHER PUBLICATIONS

French Search Report and Written Opinion dated Apr. 20, 2016 for corresponding French Application No. 1556016, filed Jun. 29, 2015.
Arrufat Adria et al., "Rate-distortion optimised transform competition for intra coding in HEVC", 2814 IEEE Visual Communications and Image Processing Conference, IEEE, Dec. 7 2814 (2814-12-87), pp. 73-76, XP832741256.
Kang Jangbyung et al., "Fast transform unit decision for HEVC", 2813 6th International Congress on Image and Signal Processing (CISP), IEEE, vol. 1, Dec. 16 2813 (2813-12-16), pp. 26-38, XP832569277.
See-May Phoong et al: "PLT versus KLT transforms", Proceedings of The 1999 IEEE International Symposium on Circuits and Systems / ISCAS '99, May 38-Jun. 2, 1999, Orlando, Florida, IEEE Service Center, Piscataway, NJ, vol. 3, 38 May 1999 (1999-85-38), pp. 516-519, XP818341841.
Goyal V K et al: "Transform coding using adaptive bases and quantization", Proceedings of the International Conference on Image Processing (ICIP) Lausanne, Sep. 16-19, 1996 [Proceedings of the International Conference on Image Processing (ICIP)], New York, IEEE, US, vol. 1, Sep. 16, 1996 (1996-89-16), pp. 365-368, XP818282678.
International Search Report dated Aug. 23, 2016 for corresponding International Application No. PCT/FR2016/051456, filed Jun. 16, 2016.
Engish translation of the International Written Opinion dated Aug. 23, 2016 for corresponding International Application No. PCT/FR2016/051456, filed Jun. 16, 2016.
Office Action dated May 13, 2019 for corresponding U.S. Appl. No. 15/740,198, filed Dec. 27, 2017.
Final Office Action dated Nov. 7, 2019 for corresponding U.S. Appl. No. 15/740,198, filed Dec. 27, 2017.
Office Action dated Apr. 1, 2020 for corresponding U.S. Appl. No. 15/740,198, filed Dec. 27, 2017.
Final Office Action dated Jul. 23, 2020 for corresponding U.S. Appl. No. 15/740,198, filed Dec. 27, 2017.
Notice of Allowance dated Oct. 14, 2020 for corresponding U.S. Appl. No. 15/740,198, filed Dec. 27, 2017.

* cited by examiner

METHOD FOR ENCODING A DIGITAL IMAGE, DECODING METHOD, DEVICES, AND ASSOCIATED COMPUTER PROGRAMS

1. CROSS-REFERENCE TO RELATED APPLICATIONS

This application is continuation of U.S. application Ser. No. 15/740,198, filed Dec. 27, 2017, which is a Section 371 National Stage Application of International Application No. PCT/FR2016/051456, filed Jun. 16, 2016, and published as WO 2017/001741 on Jan. 5, 2017, not in English, the contents of which are incorporated herein by reference in their entireties.

2. FIELD OF THE INVENTION

The field of the invention is that of the compression of signal, in particular a digital image or a sequence of digital images, divided into blocks of pixels.

The invention relates more particularly to the reporting of a transform applied to a block of pixels, in a context of competition of transforms.

The encoding/decoding of digital images applies in particular to images from at least one video sequence comprising:

images from the same camera and succeeding each other temporally (type-2D encoding/decoding), images from different cameras oriented according to different views (3D-type encoding/decoding), components of corresponding texture and depth (3D-type encoding/decoding), etc.

The present invention applies in a similar manner to the 2D- or 3D-type encoding/decoding of images.

The invention may especially, but not exclusively, apply to the video encoding implemented in the current AVC and HEVC video encoders and their extensions (MVC, 3D-AVC, MV-HEVC, 3D-HEVC, etc.) and to corresponding decoding.

3. DESCRIPTION OF PRIOR ART

A conventional compression scheme of a digital image is considered, in which the image is divided into blocks of pixels. A current block to be encoded, which constitutes an initial coding unit, is generally divided into a variable number of sub-blocks according to a preset cutting mode.

In connection with FIG. 1, we consider a sequence of digital images $I_1$, $I_2$, $I_k$ with k a non-zero integer. An image $I_k$ is cut into initial encoding units or CTU ("Coding Tree Units") in the terminology of the HEVC standard as specified in the document "ISO/IEC 23008-2:2013—High efficiency coding and media delivery in heterogeneous environments—Part 2: High efficiency video coding», International Organization for Standardization, published in November 2013. The standard encoders typically offer regular partitioning, based on square or rectangular blocks, called CU ("Coding Units") with fixed size. Partitioning is always carried out from the initial, unpartitioned encoding unit, and the final partitioning is calculated and reported from this neutral base.

Each CU is subjected to an encoding or decoding operation consisting of a sequence of operations, including in a non-exhaustive manner a prediction, a residue calculation, a transformation, a quantization and an entropic encoding.

This sequence of operations is known from the prior art and presented in relation to FIG. 2.

The first block CTU to be processed is selected as the current block c. For example, this is the first block (in lexicographic order). This block has N×N pixels, with N a non-zero integer, for example equal to 64 according to the HEVC standard.

During a step E1, a prediction Pr of the original block b is determined. It is a prediction block constructed by known means, typically by motion compensation (a block originating from a previously decoded reference image) or by intra prediction (a block constructed from the decoded pixels immediately adjacent to the current block in the ID image). The prediction information related to Pr is encoded in the bitstream TB or compressed file CF. It is assumed here that there are P possible prediction modes $m_1, m_2, \ldots, m_p$, where P is a non-zero integer. For example, the selected prediction mode for the current block c is the mode $m_p$. Some prediction modes are associated with an Intra type prediction, others with an INTER type prediction.

During a step E2, an original residue R is formed by subtraction of R=c−Pr from the prediction Pr of the current block c in the current block c.

In E3, a transform is identified which is applied to the residue R obtained.

The transformation step plays a crucial role in such a video coding scheme: indeed, it concentrates the information before the quantization operation. The result is a set of residual pixels before encoding which is represented on a small number of non-zero frequency coefficients representing the same information. Thus, instead of transmitting a large number of factors, only a small number will be needed to reconstruct faithfully a block of pixels.

In image and video coding, orthogonal or quasi-orthogonal (4×4, 8×8, etc.) block transforms are generally used. The most used transforms are based on cosine bases. The DCT is thus present in most standards for image and video. Recently the HEVC standard has also introduced the DST (for "Discrete Sine Transform") for the encoding of particular residues in the case of 4×4 blocks.

In fact, approximations of these transforms are used, the calculations being carried out on integers. In general, the bases of transforms are approximated to the nearest integer, on a given precision (usually 8 bits).

As an example, transforms used by the HEVC standard on 4×4 size blocks are presented in connection with FIGS. 3A and 3B: these are the DCT and DST transforms. The values presented in this table are to be divided by 128 to find the quasi-orthonormal transformations.

More recently, the notion of transform competition has been introduced. For a given block size and a given prediction mode, the encoder can choose between T transforms with T a non-zero integer, generally greater than or equal to 2. In the same way as for partitioning a block, it applies them in turn to the current block, then evaluates them according to a rate-distortion criterion. The chosen transform is the one that obtains the best performance:

The HEVC standard provides, for the 4×4 blocks, the choice between a DST type transformation or a transform skip (that is, the residual coefficients do not undergo a transform).

In the publication by A. Arrufat et al, entitled Rate-distortion optimized transform competition for intra coding in HEVC "Published in the Proceeding of the IEEE Visual Communication Conference on Image Processing, in December 2014, which was held in Valletta, Malta. pp. 73, the encoder has the choice of multiple transforms. For example, 5 transforms are suggested for the blocks of 4×4 size and 17 transforms for the blocks of 8×8 size. Step E3 therefore identifies one of the transforms available depending on the size of the current block.

During a step E4, the residue R is converted into a transformed residual block, called TR, by the identified transform. This is such a type of block transform (DCT or DST or commonly suitable transformations), or a wavelet transform, all known to the art and in particular implemented in JPEG/MPEG standards for DCT/DST and JPEG2000 for the wavelet transform.

In E5, in a manner known in the state of the art, these coefficients are scanned in a preset order so as to constitute a monodimensional vector RQ[j], where the index j varies from 0 to Nb−1, with Nb an integer equal to the number of pixels of the block c. The index j is called the frequency of the coefficient RQ[j]. Conventionally, these coefficients are scanned in ascending or decreasing order of frequency, for example according to a zigzag path, which is known from the JPEG fixed image encoding standard.

In E6, the transformed residue TR is quantized by conventional quantification means, for example scalar or vector, into a quantized residue block RQ including as many coefficients as the residual block RQ contains pixels, for example Nb, with Nb a non-zero integer.

During a step E7, the information relating to the coefficients of the residual block RQ is encoded by entropic coding, for example according to a Huffman encoding technique or an arithmetic encoding technique. This information comprises at least the amplitude of the coefficients, their signs and the reporting of the transform applied to the block by the encoder. By amplitude herein is meant the absolute value of the coefficient. Conventionally, it is possible to encode for each coefficient information representative of the fact that the coefficient is non-zero. Then, for each non-zero coefficient, one or more pieces of information relating to the amplitude are encoded. The encoded amplitudes CAs are obtained. The signs of the non-zero coefficients are also encoded. Generally, they are simply coded by a bit 0 or 1, each value corresponding to a given polarity. Such encoding obtains efficient performances because, due to the transformation, the values of the amplitudes to be encoded are largely zero.

Regarding the applied transform, in the case of the HEVC standard, the reverse transform to be applied among the two alternatives DST or transform skip, is indicated to the decoder by a bit, which is called a transform_skip_flag.

In the case of the publication of A. Arrufat et al, the decoder is informed by an indicator and explicit reporting approach: the encoder reports by an indicator (indicator in position 0) whether the transform is a HEVC type transform (depending on the size, it is a DCT or a DST) or a particular transform (indicator in position 1). If the indicator indicates a particular transform, the index of the particular transformation used is reported to the decoder on a fixed length code (2 for the 4×4 blocks and 4 for the 8×8 blocks in order to report the 4 and 16 possible specific transformations, respectively).

By increasing the number of transforms, the coding performance is improved because each transform is statistically adapted to a given type of residual signal. Gains on text and graphic signals are reported by the transform skip technique and on any kind of signals (images containing text, graphics synthetic or representing natural scenes filmed) by the technique disclosed in the publication of A. Arrufat.

In E8, the encoder evaluates the applied transform, under the control of a rate-distortion criterion, from the encoded residue.

The above steps E1 to E8 applied to the current block c are repeated for the T transforms available to the encoder.

In E9, once all the available transforms have been applied, they are put into competition according to a rate-distortion criterion and the transform which obtains the best result according to this criterion is finally retained.

In E10, the encoded data relating to the current block are inserted into the bit stream TB.

The other blocks of the image I1 are processed in the same way, similarly for the following images of the sequence.

4. DISADVANTAGES OF THE PRIOR ART

The disadvantages of the prior art are as follows:
multiplying the number of transforms results in increased reporting to indicate to the decoder the transforms selected by the encoder.
this increased reporting cost, which is considered in the competition between transforms, impacts the compression performances.

5. SUMMARY OF THE INVENTION

These objectives, as well as others which will appear hereinafter, are achieved by means of an method for encoding a digital image, said image being divided into a plurality of blocks of pixels processed in a defined order, said method comprising the following steps, implemented for a current block, with preset sizes:
Predicting the current block values from at least one block previously processed in a mode of prediction selected from a plurality of preset modes,
Calculating a residual block by subtracting the predicted values from the original values of the current block,
Obtaining a residual block transformed by applying a transform to pixels of the residual block, said transformed residual block comprising coefficients, the transform being part of a preset list of transforms; and
Encoding the transformed residual block.

According to the invention, the method comprises a step of calculating at least one characteristic representative of at least one transformed residual coefficient of the current block and a step determining an initial identification data representative of a sub-list of at least one transform associated with said at least one calculated characteristic.

With the invention, a sub-list of probable transforms for the current block, from at least one characteristic of the processed residual signal, is determined at the encoder. Such a sub-list is a sub-set of the list of transforms available to the encoder, and presents a smaller number of elements than that of this list.

The inventor has observed a relationship between the values of certain characteristics of the transformed residual signal of the current block and the transform which has been applied to that block. In other words, the residual signal of the block carries information on the transform applied thereto. The inventor has established the possibility of identifying one or several transforms having a high probability of being selected by the encoder for processing this block, from one or more characteristics of the residual signal.

This determination relies on values that a decoder extracts from the bit stream. For example, these are the values of the transformed coefficients encoded and inserted into the bitstream by the encoder. They may have undergone a quantization step or not. It is assumed that the decoder has means to reproduce the calculation of the characteristic(s) of the residual signal from the data it reads in the binary train and the determination of the initial data representative of the sub-list of transforms in a manner similar to that of the encoder.

It is understood that in a context of transform competition, wherein the encoder applies to the current block the transform which provides better performances from a rate-distortion viewpoint, the fact of predicting a sub-list of transforms with a strong probability of being selected by the encoder, reduces the amount of information to be reported in the bit stream to enable the decoder to identify the applied transform.

The invention is thus based on an entirely new and inventive approach to transform competition that comprises firstly determining, for a current block, a sub-list of probable transforms, known jointly by the encoder and decoder, and secondly carrying out this determination based on information intrinsic to the converted residual signal of the current block, transmitted in the bitstream and thus available to the decoder.

Unlike the prior art that reports the transform used by an indicator of (HEVC or other)-type transform, then by explicit reporting of an identifier of the transform used when it is not part of the HEVC-type, the invention allows to avoid systematic reporting, since it proposes to report the transform applied to the current block based on the original identification data that the decoder has means to determine the identity of the encoder.

If the applied transform corresponds to the single transform of the predicted sub-list, the encoder has potentially no reporting to transmit to the decoder. The invention thus reduces the reporting cost associated with the selection of a transform and therefore is to improve the quality of the image sequence encoded for a given bit rate, or to lower the encoding rate for a quality provided by the gain in reporting rate.

When the initial data represents a single transform, it may limit the reporting to one flag, for example equal to zero to indicate that the applied transform corresponds to the set initial data or to 1 to report otherwise. In the case of a simplified decoder that would not involve a transform which does not match the initial data determined, it may be decided not to report anything at all.

According to one aspect of the invention, the method comprises a step of encoding data complementary to the initial identification data of transforms.

When the sub-list of transforms comprises more than one element, complementary data is encoded and inserted into the bitstream in order to specify to the decoder how to exploit the sub-list determined for the current block.

According to another aspect of the invention, the complementary data comprises a position index of the transform in the specified sub-list.

When the transform applied to the current block is part of the specific sub-list, the position index allows the decoder to identify the transform of the sub-list that has been applied to the current block by the encoder. It is understood that if the sub-list is short, the position index can be encoded on few bits.

This indication is preferably carried by a bit of value 0. In the opposite case, the complementary identifier will be carried by a bit of value 1, supplemented by explicit reporting of the applied transform. Inasmuch as the initial data, representative of the sub-list SL, has correctly predicted the transform, the complementary reporting thus contains one bit only. According to another aspect of the invention, when the transform applied is not part of the specific sub-list, the position index takes an escape value and the complementary data further comprises the identifier of the applied transform.

When the transform applied is not selected in the predicted sub-list, it is necessary to report a full identifier of the transform actually applied by the encoder.

One advantage of the invention is that if the sub-lists are elaborated relevantly and comprise the transforms likely to provide the best performances, then this situation remains exceptional.

It is further noted that when the encoder implements a transform competition, it usually selects the best transform according to a rate-distortion criterion which advantageously considers the reporting cost of each of the transform competition. In this way, it will select a transform outside the sub-list only if its performances offset the additional cost of reporting.

According to another aspect of the invention, said at least one characteristic representative of at least one coefficient value of the transform residual block is part of the group comprising at least:
  a position of the last significant quantized residual coefficient;
  a list of positions of the significant residual coefficients;
  a sum of the squares of quantized residual coefficients;
  a sum of the absolute values of the quantized residual coefficients;
  a value representative of an evolution of the squares of the quantized residual coefficients;
  a value representative of an evolution of the absolute values of the quantized residual coefficients;
  a value representative of a probability density of the quantized residual coefficients.

These characteristics can be considered individually or in combination. The principle of the invention is to associate with a value or a range of values of one or more characteristics of the quantized residual signal of the current block, which is sufficiently distinctive to single out one or more transforms which are most likely for this block.

According to yet another aspect of the invention, the determining step comprises reading in a memory of the initial identification data determined, said data being associated with said at least one characteristic of at least one value of a quantized residual coefficient of the current block. The sub-lists of probable transforms are preset. An advantage of this embodiment is that it is simple and inexpensive in computational resources.

According to yet another aspect of the invention, a score being previously assigned to a transform for at least one characteristic of at least a value of a quantized residual coefficient of the current block, the determining step forms the sub-list from the transforms of the list whose score is greater than a preset threshold.

Advantageously, a given transform is assigned a score based on at least one value of at least one characteristic of the quantized residual signal of the block and, for the current block, a sub-list of transforms, whose scores are higher at a preset threshold, is constructed dynamically.

For example, the scores were derived from statistics of performances of transforms computed for a set of test sequences. From such statistics, it is possible to determine the probability values that a particular transform is the most efficient for a block for which at least one particular characteristic of the quantized residual signal takes a particular value.

One advantage is to form the sub-list that is best suited to the current block.

Alternatively, the transforms are ordered in decreasing score values and the sub-list is formed from a preset number of transforms with the highest scores. One advantage is that the sub-lists formed are of fixed size.

According to yet another aspect of the invention, the determining step of the initial identification data of transforms inserts in the sub-list the transform applied to at least one neighboring block previously processed.

Other criteria may also be considered in addition to characteristics of the quantized residue signal, to form a sub-list of probable transforms for the current block. One option is to consider the transforms applied to neighboring blocks of the current block already processed. We can then choose to add the transforms used by neighbors in the sub-list or to keep only the common transforms.

The method which has just been described in its various embodiments is advantageously implemented by a device for encoding a digital image according to the invention. Such a device comprises at least the following units, adapted to be implemented for a current block, with preset sizes:
  Predicting the current block values from at least one block previously processed in a mode of prediction selected from a plurality of preset modes,
  Calculating a residual block by subtracting the predicted values from the original values of the current block,
  Obtaining a residual block transformed by applying a transform to pixels of the residual block, said transformed residual block comprising coefficients, the transform being part of a preset list of transforms; and
  Encoding the transformed residual block.

According to the invention, such a device comprises in addition a calculating unit of at least one characteristic representative of at least one transformed residual coefficient of the current block and a determining unit of an initial identification data representative of a sub-list of at least one transform associated with said at least one calculated characteristic.

Of course, the encoding device according to the invention can be arranged to implement, independently or in combination, all of the embodiments that have just been described for the encoding method.

In particular, according to one aspect of the invention, it comprises an encoding unit of a data complementary to the set initial data.

Correlatively, disclosed is a method for decoding a digital image from a bit stream comprising encoded data representative of said image, said image being divided into a plurality of blocks of pixels processed in a defined order, said method comprising the following steps, implemented for a block, so-called current block:
  Predicting the current block from at least one previously processed block;
  Decoding the encoded values of the coefficients of the transformed residual block extracted from the bitstream;
  Obtaining a residual block by applying to the transformed residual block an identified reverse transform, said reverse transform being part of a list of preset reverse transforms;
  Reconstructing the decoded block from the residual block and from the prediction of the current block;

According to the invention, the method comprises a step of calculating at least one characteristic representative of at least one transformed residual coefficient of the current block, a step of determining an initial data of identification of transforms associated with said at least one calculated characteristic and a step of reconstructing an identifier of the reverse transform to be applied at least from the set initial data.

Such a method reproduces the steps of calculating the characteristics of the transformed residual signal and of determining an initial data of identification of transforms which have just been described for the encoder. To do this, it uses the information available to it, namely those that it extracts from the bitstream, such as for instance the transformed residue signal quantized or not, the current block, the information and rules it has previously stored in memory, which enable it to determine the same sub-list as the encoder for the current block.

It then rebuilds the identifier of the transform applied by the encoder to the current block at least from the knowledge of this sub-list. When the sub-lists have at most one element, the initial identification data may be sufficient to reconstruct the identifier of the applied transform. One can consider a type of decoder arranged to systematically apply the transform represented by the data DI.

According to one aspect of the invention, the method comprises a step of decoding a data complementary to the set initial identification.

Another type of decoder arranged to exploit such complementary reporting may also be considered. Advantageously, the decoding of this complementary data specifies the information contained in the sub-list of transforms. In particular, it can indicate to the decoder whether the applied transform is in the sub-list represented by the data DI.

According to another aspect of the invention, the complementary data comprises a position index of the transform in the specified sub-list.

When the transform applied by the encoder is comprised in the sub-list, if this sub-list comprises more than one element, the reporting boils down to indicating the position of the transform. According to yet another aspect, the complementary data comprises an escape code and an identifier of the applied transform.

When the transform applied by the encoder to the current block is not comprised in the sub-list, it is necessary to report the transform completely.

The method which has just been described in its various embodiments is advantageously implemented by a device for decoding a digital image according to the invention. Such a device comprises at least the following units, adapted to be implemented for a so-called current block:
  Predicting the current block from at least one block previously processed;
  Decoding the encoded values of the coefficients of the transformed residual block extracted from the bitstream;
  Obtaining a residual block by applying to the transformed residual block a reverse transform, said reverse transform being part of a list of preset reverse transforms;
  Reconstructing the decoded block from the residual block and from the prediction of the current block;

According to the invention, such a device comprises a unit for calculating at least one characteristic representative of at least one transformed residual coefficient of the current block, a step of determining an initial data of identification of transforms associated with said at least one calculated characteristic and in that it comprises a step of reconstructing an identifier of the reverse transform to be applied at least from the set initial data.

Of course, the decoding device according to the invention can be arranged to implement, independently or in combination, all of the embodiments that have just been described for the decoding method.

In particular, according to one aspect of the invention, it comprises a unit of decoding a data complementary to the set initial data and the reconstruction unit is able to reconstruct the identifier of the reverse transform to be applied to the current block from the initial data and from said complementary data.

The invention further relates to a signal carrying a bit stream and including encoded data representative of a digital image, said digital image being divided into blocks of pixels processed in a set order, the values of a current block being predicted from the values of at least one block previously processed according to a mode of prediction selected from a plurality of preset modes, the values of a residual block being calculated by subtracting the predicted values from the original values of the current block, a transformed residual block being obtained by applying a transform to pixels of the residual block, said transformed residual block comprising coefficients, the transform being part of a preset list of transforms.

According to the invention, such a signal comprises an encoded complementary data representative of the applied transform. said encoded complementary data being intended for being exploited in order to reconstruct an identifier of the reverse transform to be applied to the values of a current residual block, from an initial identification data of transforms, said initial data being representative of a sub-list of at least one transform of said list and associated with at least one characteristic of at least one value of the current transformed residual block.

The invention also relates to a user terminal comprising a device for encoding a digital image according to the invention and a device for decoding a digital image according to the invention which have just been described in their different embodiments.

The invention also relates to a computer program comprising instructions for implementing the steps of a method for encoding a digital image as described above, when this program is executed by a processor.

The invention also relates to a computer program comprising instructions for implementing the steps of a method for decoding a digital image as described above, when this program is executed by a processor.

These programs can use any programming language. They can be downloaded from a communication network and/or recorded on a computer-readable medium.

The invention relates to recording media, readable by a processor, integrated or not integrated with the encoding device of a digital image and with the device for decoding a digital image according to the invention, which is optionally removable, thereby storing respectively a computer program implementing a coding method and a computer program implementing a decoding method, as described above.

According to one aspect of the invention a method is provided for decoding a picture from a bitstream comprising encoded values of coefficients of transformed residual blocks representative of said picture, said method comprising the following, implemented by a decoding device for a current transformed residual block:
   decoding encoded values of coefficients of the current transformed residual block;
   calculating a value of a position of the last significant decoded coefficient value of the current transformed residual block;
   determining data representative of one or more transforms in at least one sub-list associated with said calculated value of the position;
      decoding an identifier of the transform from the at least one sub-list represented by said decoded data;
      decoding the current transformed residual block using the transform identified by the identifier.

According to an aspect of the invention, the method further comprises the decoding device receiving the bitstream from a communication network or from a non-transitory computer-readable medium on which the bitstream is stored and extracting the encoded values of coefficients from the bitstream.

According to one aspect of the invention a device is provided for decoding a picture from a bitstream comprising encoded values of coefficients of transformed residual blocks representative of said picture, wherein the device comprises:
   a processor; and
   a non-transitory computer-readable medium comprising instructions stored thereon, which when executed by the processor configure the device for decoding to perform the following acts implemented for a current transformed residual block:
   decoding encoded values of coefficients of the current transformed residual block;
   calculating a value of a position of the last significant decoded coefficient value of the current transformed residual block;
   determining data representative of one or more transforms in at least one sub-list associated with said calculated value of the position;
   decoding an identifier of the transform from the at least one sub-list represented by said decoded data;
   decoding the current transformed residual block using the transform identified by the identifier.

According to an aspect of the invention, the device the instructions further configure to the device to:
   receive the bitstream from a communication network or from a non-transitory computer-readable medium on which the bitstream is stored and extract the encoded values of coefficients from the bitstream.

According to one aspect of the invention a user terminal comprises the device for decoding a picture.

According to one aspect of the invention at least one non-transitory computer-readable medium comprises a computer program stored thereon comprising instructions for implementing a method for decoding a picture from a bitstream, when executed by a processor of a decoding device, said bitstream comprising encoded values of coefficients of transformed residual blocks representative of said picture, said method comprising the following, implemented for a current transformed residual block:
   decoding encoded values of coefficients of the current transformed residual block;
   calculating a value of a position of the last significant decoded coefficient value of the current transformed residual block;
   determining data representative of one or more transforms in at least one sub-list associated with said calculated value of the position;
   decoding an identifier of the transform from the at least one sub-list represented by said decoded data;

decoding the current transformed residual block using the transform identified by the identifier.

According to one aspect of the invention, the method further comprises:

receiving the bitstream from a communication network or from the at least one non-transitory computer-readable medium on which the bitstream is stored and extracting the encoded values of coefficients from the bitstream.

6. LIST OF FIGURES

Other features and advantages of the invention will become evident on reading the following description of one particular embodiment of the invention, given by way of illustrative and non-limiting example only, and with the appended drawings among which:

Figure 8A:
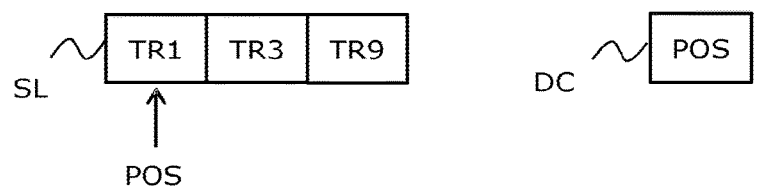
Figure 8B:
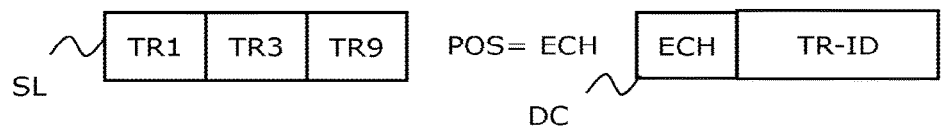
Figure 9:
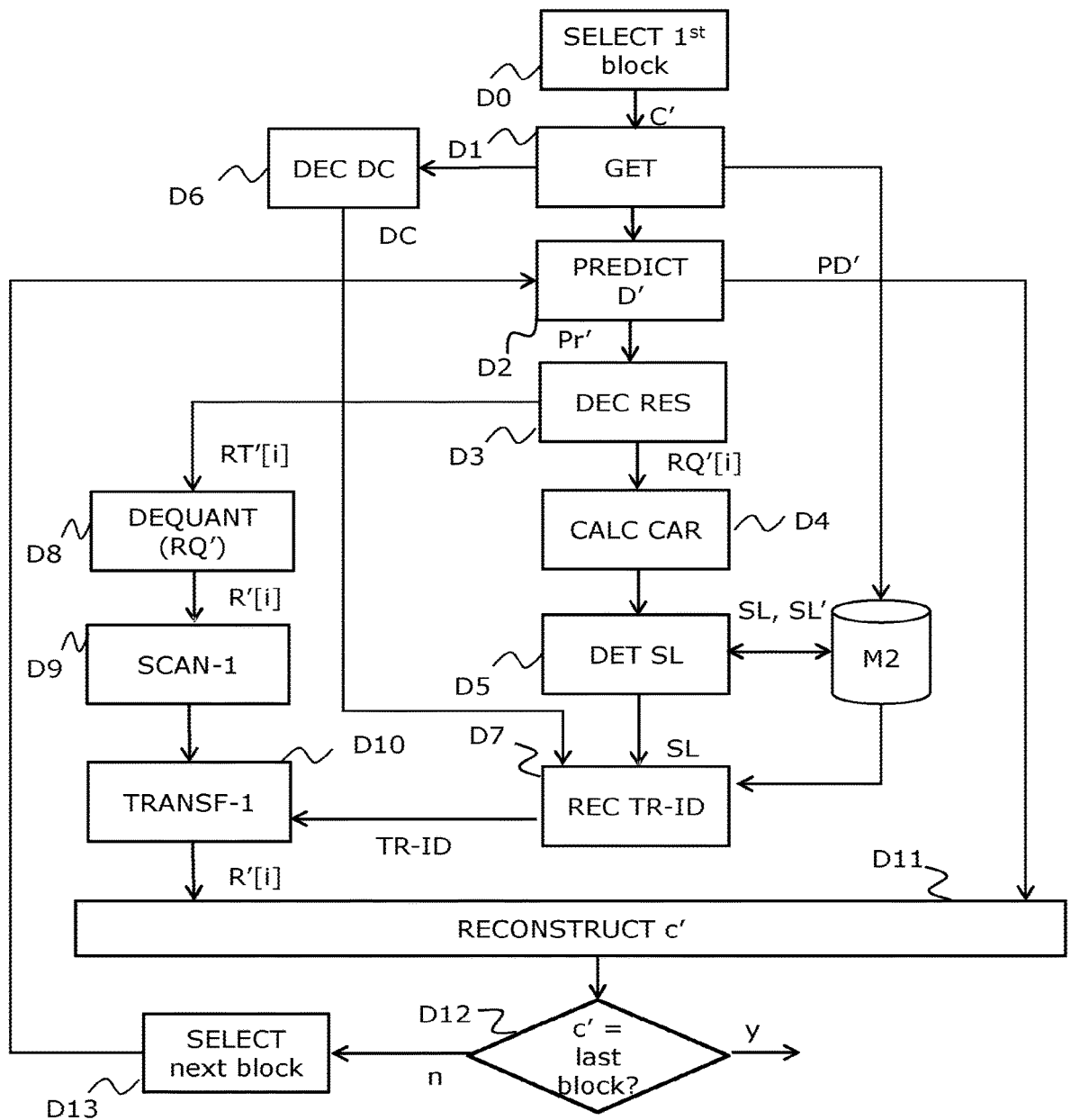
Figure 10:
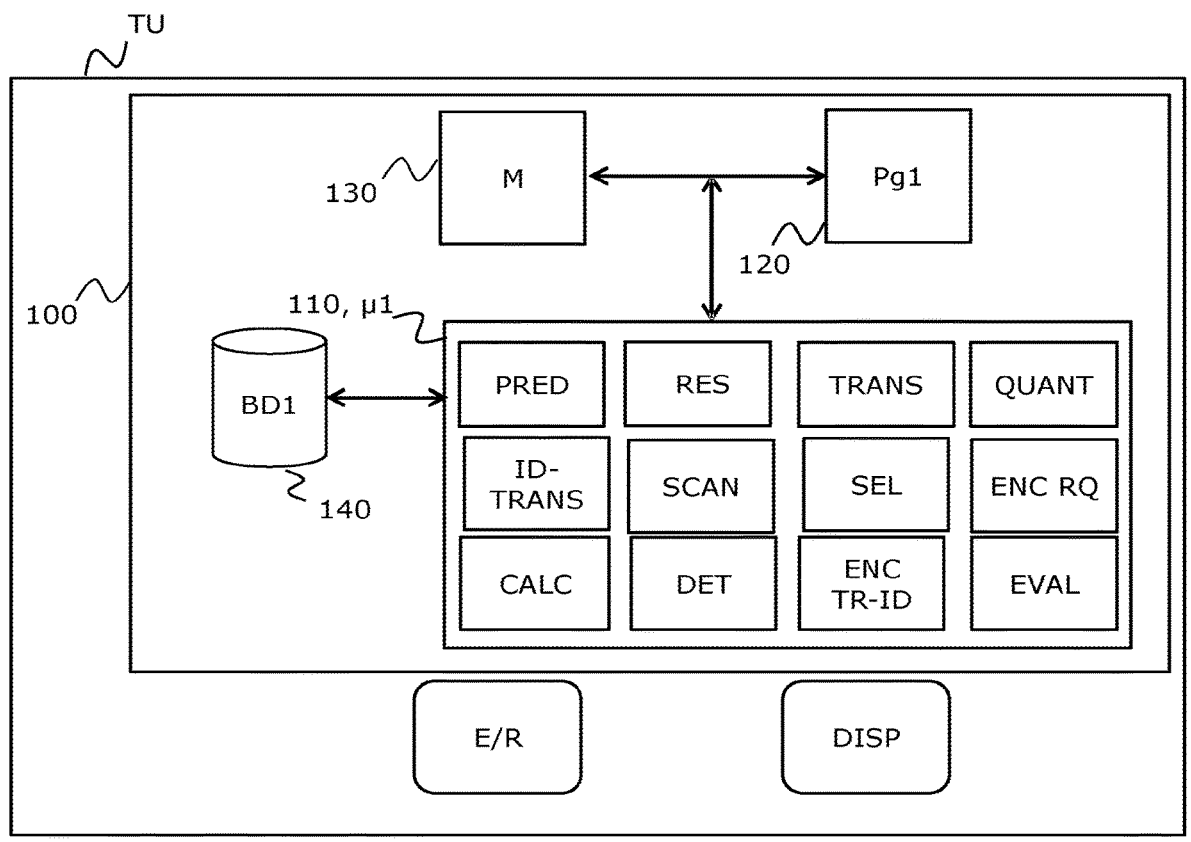
Figure 11:
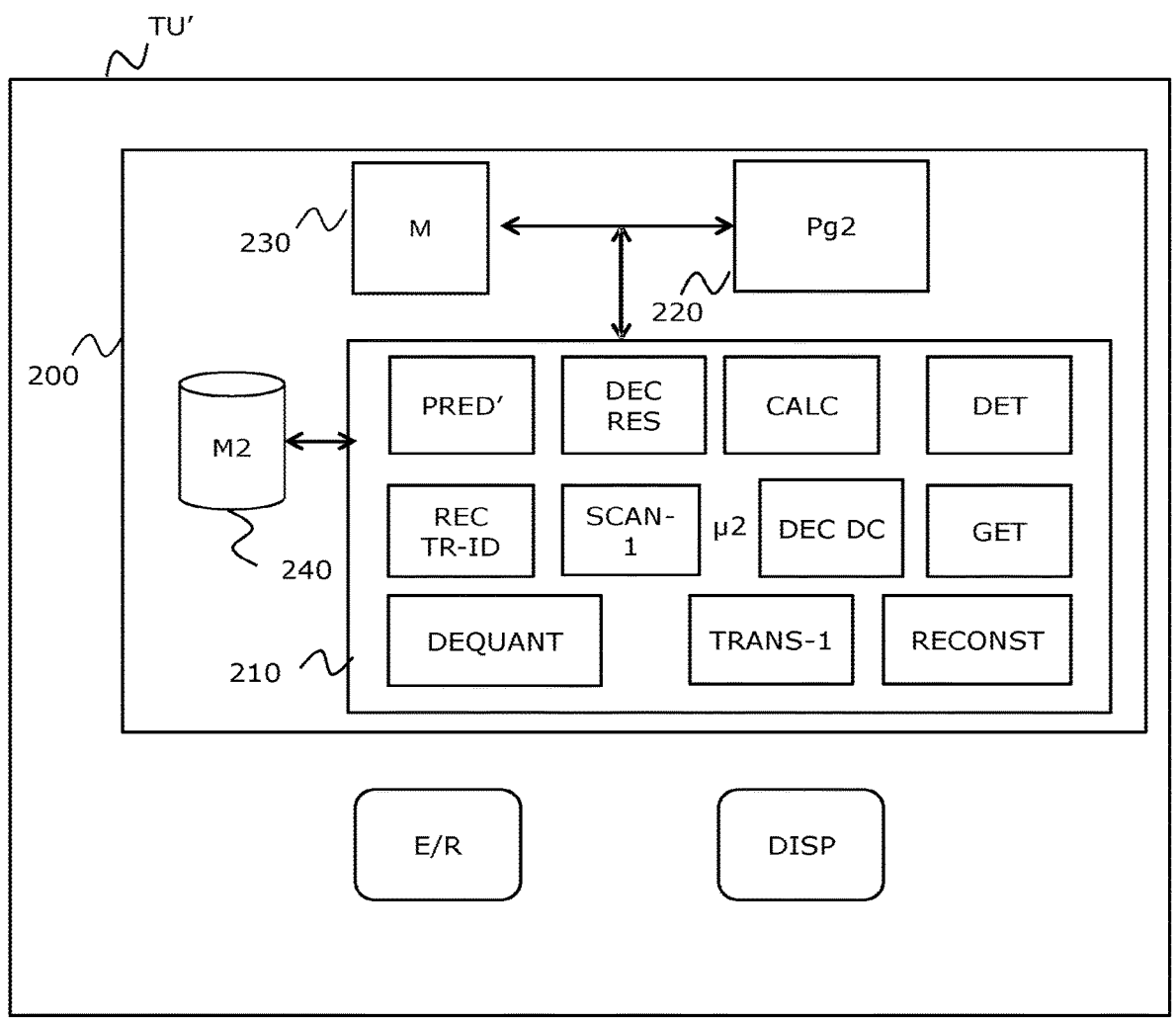

FIGS. 8A and 8B present schematically the examples of reporting the transform applied to the current block by the encoding method according to the invention;

FIG. 9 shows schematically the steps of a method for decoding a digital image according to the invention;

FIG. 10 shows schematically the hardware structure of a device for encoding a digital image according to the invention; and FIG. 11 shows schematically the hardware structure of a device for decoding a digital image according to the invention.

7. DESCRIPTION OF A PARTICULAR EMBODIMENT OF THE INVENTION

The general principle of the invention relies on a prediction of the transform applied to a current block based on intrinsic characteristics to the transformed residual signal of the current block and in the form of a sub-list of preferred transforms and on minimum reporting of the transform applied from the predicted sub-list.

Figures 1, 3A, 3B:
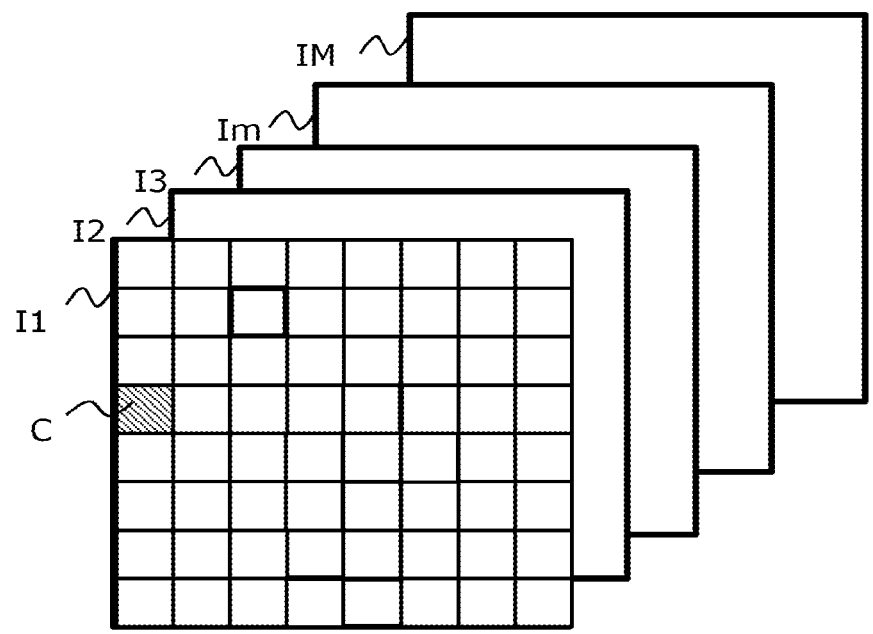
FIG. 1 (already described) shows schematically a sequence of digital images divided into blocks of pixels.
FIGS. 3A and 3B (already described) show the DCT and DST transforms implemented by the encoder of the HVC standard.

An original video is considered, consisting of a sequence of K images $I_1, I_2, \ldots I_K$, whereas K is non-zero integer, as that already presented in relation to FIG. 1. The images are encoded by an encoder, the encoded data are inserted in a bit stream TB transmitted to a decoder via a communication, or a compressed file FC, intended to be stored on a hard disk for example. The decoder extracts the data which are encoded, then received and decoded by a decoder in a predefined order known to the encoder and the decoder, for example in the time order $I_1$, then $I_2, \ldots$, then $I_K$, whereas this order may differ according to the embodiment.

Figure 2:
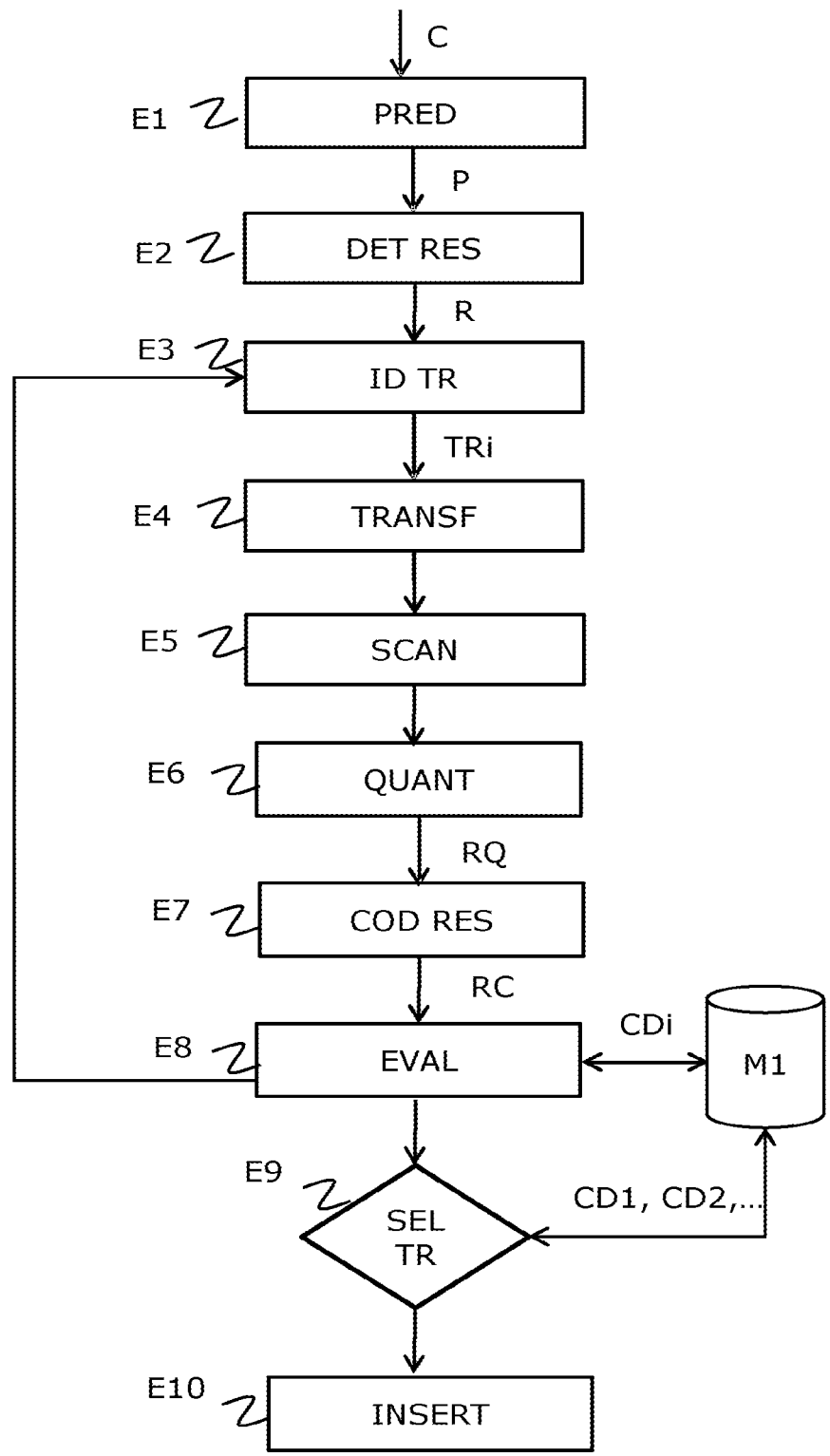
FIG. 2 (already described) shows schematically the steps of a method for encoding a block of pixels of a digital image according to the prior art.
Figure 4:
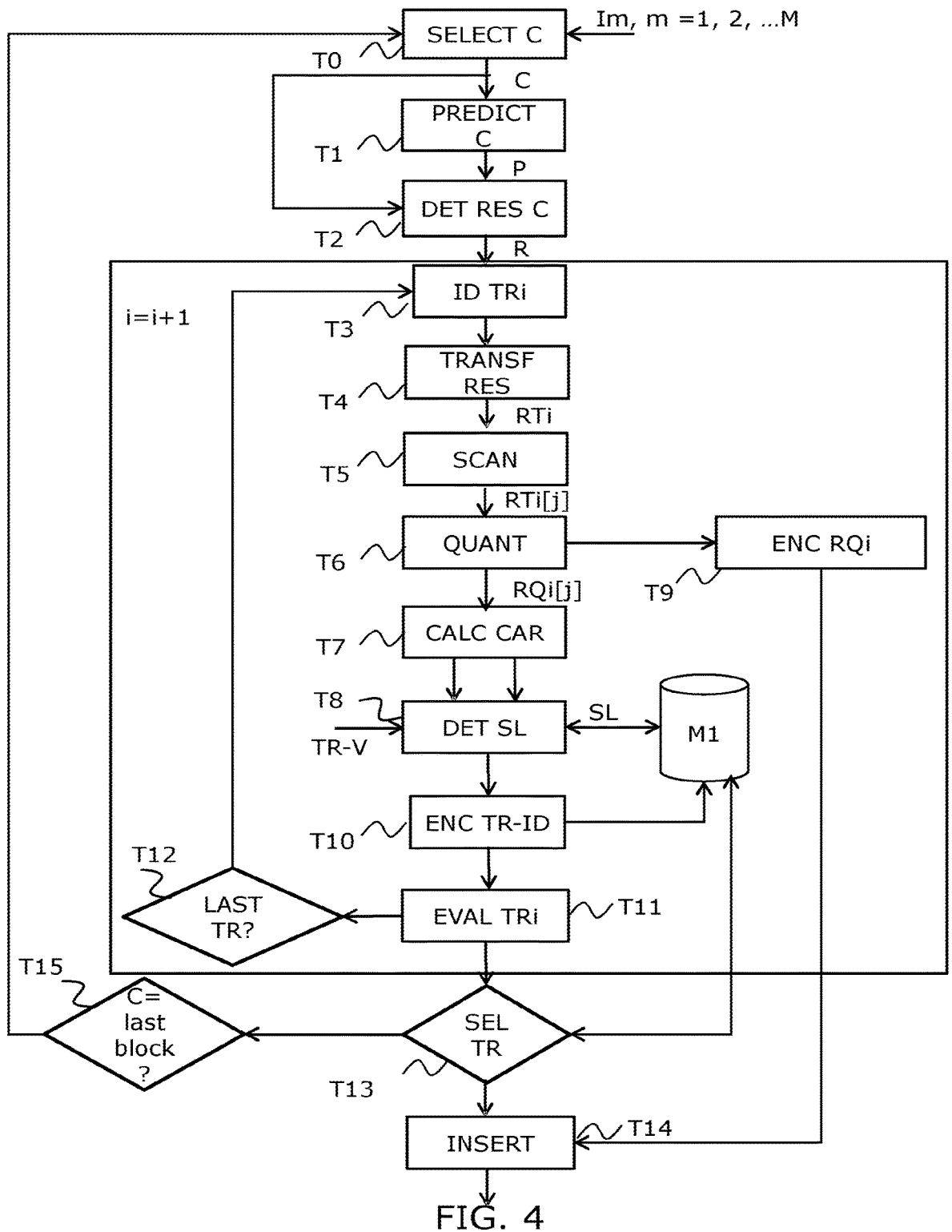
FIG. 4 shows schematically the steps of a method for encoding a digital image according to the invention.

In relation to FIG. 4, the steps of a method for encoding a digital image according to an exemplary embodiment of the invention are now illustrated. The steps T0 to T6 are similar to the steps E0 to E6 already described in relation to FIG. 2.

An image $I_k$ is cut into CTU blocks of size, for example equal to 64×64 pixels.

During a step T0, a block to be processed, said current block c is selected. For example, this is a CU block (for "Coding Unit"), square or rectangular, of dimensions M×N, where M and N are non-zero integers, obtained by partitioning a CTU block (for "Coding Tree Unit").

During a step T1, the block c is predicted in a step. This operation, according to the prior art, is carried out from pixels derived from the encoding current picture (intra coding) or based on an image already processed by the encoding operation (inter coding). The result is a predicted block Pr.

During a step T2, the pixel block is subtracted, pixel by pixel, from the predicted block in the previous operation. The result is a block of residual pixels R.

During a step T3, the block size and the possible transforms are identified for the prediction mode considered. By possible transforms is designated a plurality T of transforms available in the memory of the encoder in a preset manner, with T a non-zero integer, for example, T is equal to 32. For example, this plurality is stored in memory as a preset, ordered or not, list L of transforms. Note that these transforms may be preset or adaptive.

During a step T4, for an identified transform $Tr_i$, wherein i is a non-zero integer, ranging between 0 and T−1, the residual signal is transformed. The result is a transformed residual signal $RT_i$.

In T5, in a manner known in the state of the art, these coefficients are scanned in a preset order so as to constitute a monodimensional vector RQ[j], where the index j varies from 0 to Nb−1, with Nb an integer equal to the number of pixels of the block c. The index j is called the frequency of the coefficient RQ[j]. Conventionally, these coefficients are scanned in ascending or descending order of frequency, for example according to a zigzag scanning, which is known from the JPEG fixed image encoding standard. This scanning method may also depend on the transform applied. As the scanning mode necessarily influences the final order of the transformed coefficients in the vector RQ, it is assumed hereinafter that a transform identified $Tr_i$ in the list L is associated with a particular scanning mode. In other words, the same transform associated with another scanning mode will be assigned another identifier of transform in the list L and will therefore be considered as a separate transform.

During a step T6, the transformed data are quantized according to a given quantization method, scalar or vector known to those skilled in the art, with a quantization parameter QP adjusting the accuracy of the approximation performed in this step.

During a step T7, at least one characteristic of the transformed quantized residual signal is calculated.

In T8, an initial data transform representative of at least one transform associated with the one or more calculated characteristic(s) is determined. This initial data DI advantageously denotes a sub-list SL of transforms of the list L. It comprises one or more transform(s).

Several embodiments of the steps T7 and T8 are considered and will now be detailed.

According to a first embodiment of the invention, the position of the last non-zero coefficient of the quantized residual data is determined. Then, the calculated characteristic is matched for example with the position of the last significant coefficient, an initial data of identification of transformation DI. This initial identification data used enables to identify the sub-list of transforms associated with the value of the calculated characteristic or a range of values including the calculated value. Advantageously, the sub-list is stored in memory in a table. The sub-list may comprise one or more transforms.

According to a second embodiment of the invention, the positions of the significant coefficients in the residual quantized data are determined. To do so, a word containing '1' for each significant residual coefficient (that is to say different non-zero) and '0' for a zero coefficient, is built. For example a residual coefficient composed of the values [19, 12,−4,0, 18,3,0,−1,0,0] will be allocated a word '1110110100'. Using a table stored in memory, an initial identification data of transformation ID is determined. For a given code word, the result is a sub-list of the most likely available transforms.

According to a third embodiment, a data characteristic of the sum of the squares or absolute values of the quantized residual values is calculated. Using a table or a functional matching relationship, an initial identification data of transformation DI is determined from this characteristic data. For example, the residues carrying an energy exceeding a considered threshold identify one or more transforms.

According to a fourth embodiment, a data characteristic of the evolution of the absolute values or of the squares of the quantized residual values is calculated. This characteristic value can be obtained by summing the differences in absolute value among the (absolute or squared) consecutive values or by summing a growth indicator (1 if two consecutive values increase in absolute value, and 0 otherwise). The initial identification data of transformation is obtained from this characteristic value. This table will show one or more transforms depending on the value of the growth indicator calculated.

According to a fifth embodiment, a characteristic of the probability density of the quantized residual values is estimated. This probability density can be achieved by using the ratio between the sum of the absolute values and the sum of the squares of the quantized residual values as presented in the publication AES of May 2005 entitled «Near Optimal, Low Complexity Arithmetic Coding for Generalized Gaussian Sources» by Florin Ghido. Once the probability density has been estimated, a lookup table allows to associate an initial identification data of transforms DI. For example, a given probability density will be associated one or more given transforms.

The initial identification data of transform DI can thus comprise one or more identifiers or indices, each pointing to a particular transform. Advantageously, these transform identifiers form a sub-list SL of the initial list L of transforms available to the encoder and the decoder.

Tables for deriving the sub-list of transforms are obtained, for example, in a learning phase prior to the method for encoding an image. For example, a set of test sequences is used to calculate selection statistics by the encoder of each of the transforms from the list available to the encoder, based on the values of characteristics of the transformed residual signals of the blocks of the image. From these results, the probability of selecting a transformed based on one or more characteristics of the quantized residual signal of a block is assessed.

Figure 5:
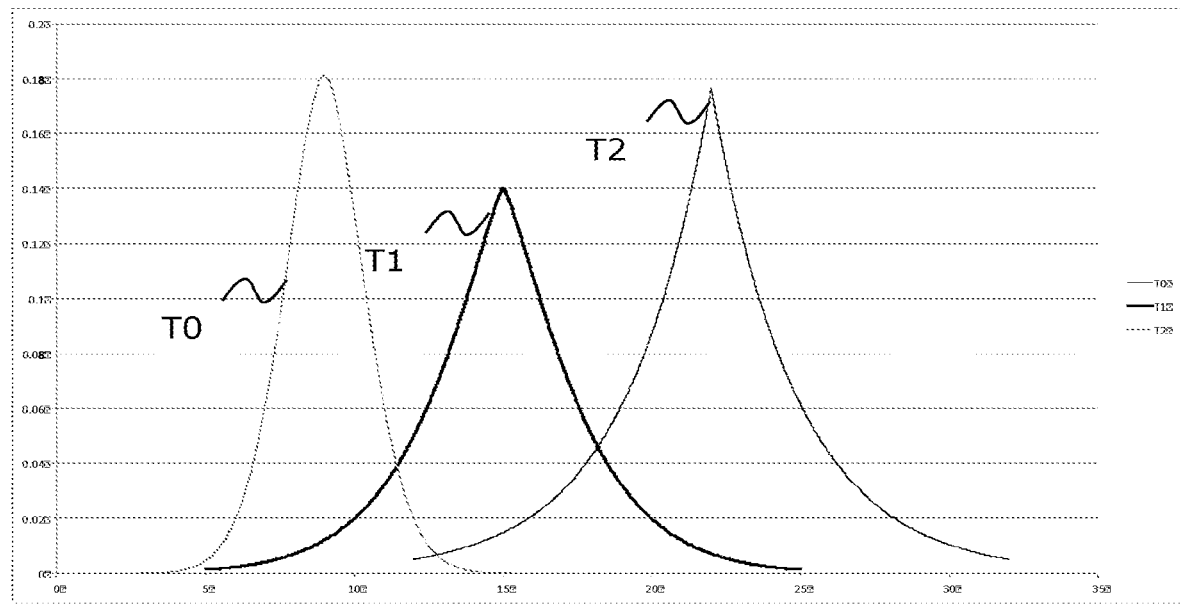
FIG. 5 shows a first example of probability density of three transforms in accordance with a measurement characteristic of the residual signal of a block.

Conventionally, if the transform is known, the probability of a given characteristic is measured for each transform. Mathematically this is expressed by the conditional probability. In connection with a FIG. 5, an estimate of the probability of the energy of the first coefficient transformed for three distinct transforms of 8×8 size is presented by way of example. The joint probability density associated with that energy for each of the coefficients of a block has been plotted. From this estimate and using Bayes' theorem, we can easily determine from the energy value, the probability that the coefficient has been calculated from each transform. Thus if the energy of the coefficient is equal to 9, it is highly probable that the transform T2 is used, somewhat less likely the transform T1 and highly unlikely the transform T0. Thus at the encoder, that probability function can be summarized by way of example by two thresholds which define three intervals: if the energy is less than 11.4 then T2 and T1 are the most likely, if it ranges between 11.40 and 18.10 then T1 is likely, if it is greater than 18.10 then T1 and T0 are the most likely transforms. It will be understood that, in this manner, the characteristic calculated on the residual signal informs on the probability of a transform and allows to constitute a sub-list of probable transforms which is shorter than the complete list of transforms. Thus, according to the energy value of the block with respect to the previous three intervals, we define three sub-lists SL1, SL2 and SL3 comprising the transforms (T2, T1), (T1), (T1, T0). The association including sub-list, characteristic and intervals that is established in a phase prior to the design of the encoding system is known to the encoder and the decoder.

Figure 6:
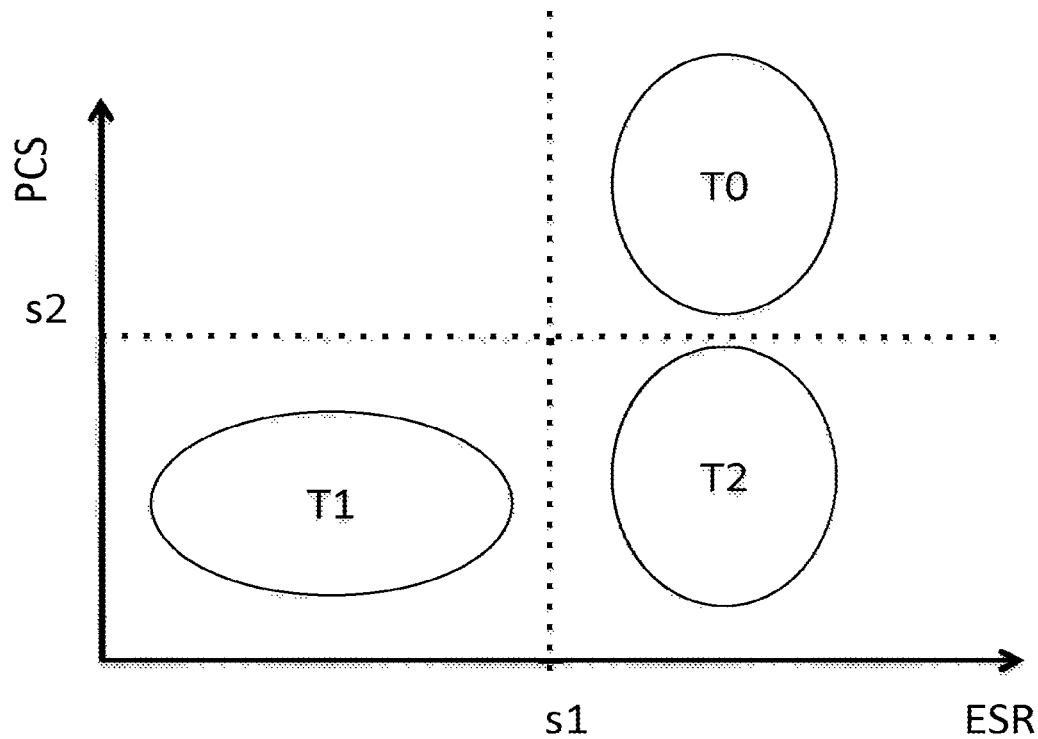
FIG. 6 shows an example of constitution of a sub-list of probable transforms from the combination of two distinct features of the transformed residual signal of the current block, according to an embodiment of the invention.

In connection with FIG. 6, an example of constitution of a sub-list of transforms from the combination of two distinct characteristics of the residual signal of the current block and a list L of three transforms is shown. In a prior learning process, the values of transforms selected by an encoder according to an energy characteristic of the transformed residual signal and to a position of the last significant coefficient are measured. This learning is performed on a large set of residual video signals. In FIG. 6, there is shown the first characteristic along a first axis and the second along a second axis and points corresponding to a pair of values of the characteristics of the transformed residual signal of a block and representing the transform selected for this block have been placed in the plane of these two axes. It appears that these points can be roughly grouped into rough areas, materialized in the form of an ellipse. These ellipses comprise most selected points for a transform, for example they may encompass 90% of the points.

Two thresholds s1, s2 are determined on this basis, which allow to form a list comprising a transform element.

These specified thresholds are known at the end of this learning process and stored both in the in the encoder and the decoder. And the sub-list of an element is prepared as follows:

An energy characteristic, named C1, is calculated from the residual signal;

The position of the last significant coefficient, named C2, is determined from the residual signal;

If C1>s1 and C2>s2 then the sub-list contains the element T0;

If C1>s1 and C2<s2 then the sub-list contains the element T2;

If C1<s1 then the sub-list contains the transform T1.

Thus a list of three transforms can be reduced by using these two criteria and two thresholds known to the decoder and encoder, to a sub-list of a single transform.

Alternatively, a score based on one or more values of characteristics of the transformed residual signal of a block can also be set previously for a given transform of the list L. This score is advantageously prepared from the estimation of the joint probability density described above. In this case, the step T7 of determining an initial data of transforms DI associated with this or these characteristic values, dynamically constitutes a sub-list of transforms SL for the current block, based on the scores established.

For example, the sub-list SL consists of transforms with scores established for the current block which are greater than a preset threshold. Alternatively, the sub-list is made up of a preset, non-zero integer number NB-SL of transforms, corresponding to the transforms NB-SL with the highest scores.

The transforms selected for inclusion in the list SL are advantageously ordered in decreasing score values. It will be understood that it is necessary for the decoder to share with the encoder the knowledge of these scores, the threshold value to be applied or the number NB-SL of transforms to select and how to order said transforms in the sub-list. In this way, it will be the same sub-list SL as the encoder.

According to another embodiment of the invention, the method first obtains an identifier TR-V of the transform applied to at least one block processed previously. The blocks already processed are selected for example depending on the prediction mode of the current block. They may be neighbors of the current block in the current image or part of other images located at different moments in time. In the current image, these neighboring blocks may be those located immediately above, left, or top left in the current block. In relation with FIG. 7, the neighboring blocks Ba, Bb and Bc of the current block C are shown by way of example.

Inter coding relates for example to the blocks located at the same spatial position as the current block, or "co-located", within one a motion vector. These blocks already processed are advantageously selected when they share the same prediction mode as the current block. If the current block is in intra mode, then the blocks already processed and selected will be the nearest blocks that share the same intra prediction mode.

Advantageously, a preset number NB-DT, with over NB-DT a non-zero integer of blocks already processed is considered. For example NB-DT is equal to 3. The identifier or identifiers of transforms of the blocks already processed thus obtained are operated to form a new sub-list SL' of transforms preferred from the sub-list SL already associated with the characteristic(s) of the values of the coefficients of the current block according to one of the embodiments previously described.

Several ways to establish this new sub-list SL' are envisaged.

The initial sub-list SL' can be completed by concatenation of the identifiers of the transforms applied to the blocks already processed and considered.

It may be decided to operate a preset number of identifiers of transforms derived from the blocks already processed, for example equal to three.

Figure 7:
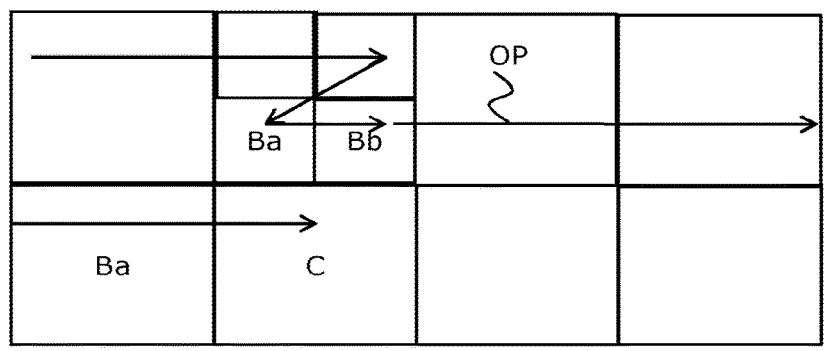
FIG. 7 shows an example of neighbouring blocks already processed and operated for determining a sub-list of probable transforms for a current block, according to an embodiment of the invention.

If, in connection with FIG. 7, the blocks Ba, Bb, Bc already processed and considered share the same transform (TR-v=TR-va=tr-vb=tr-vc), then the identifier is added (TR-v) of this transform common to the sub-list SL, if it is not already contained in this list. It may be for example appropriate to insert it at the end of sub-list.

Alternatively, it may be decided to comprise in the sub-list SL' a preset number NB-DT of transforms derived from blocks already processed. In this case, the single selected identifier (TR-v) can be completed for example by the identifiers of the transforms that immediately precede and succeed it in the initial list L of transforms. These are values situated immediately above (TR-$v_1$=TR-v+1) and the below (TR-$v_2$=TR-v−1). It is understood that in this case we consider that the list L of transforms available to the encoder and the decoder, is ordered according to a proximity or similarity criterion of transforms, so that if the transforms number TR-v is well suited for a block, then its neighbors TR-v−1 and TR-v+1 will also be relatively well suited.

If the NB-DT blocks already processed have been applied distinct transforms, one can resort to a majority vote and insert in the sub-list SL' the identifier of the transform most represented in blocks already processed. To complete and reach the preset number of identifiers of transforms to be added, the neighboring values of the transform elected in the list L, TR-v1 and TR-v2 as calculated above, will be advantageously inserted.

An alternative is to insert the identifiers of all the transforms applied to blocks already processed and considered, for example at the end of the sub-list SL as a scanning order of the blocks already processed and shared by the encoder and decoder, inasmuch as they are not already part of the list.

For example, let us consider three neighboring blocks already processed, which have applied two distinct transforms. For example, at the end of the sub-list SL, the identifiers v0 and v1 of these transforms are inserted at the first and second positions at the end of the sub-list SL and the value v2 of the identifier of the transform, calculated from the nearest block, for example, is added, to the current block (immediately on the left being privileged compared to a higher block or part of a different image). According to a variation, there is provided the intersection of the initial sub-list SL and that of the transforms applied to the neighboring blocks already processed. This crossing can reduce the size of the final sub-list and thus the reporting of the transform applied to the current block. This crossing may be carried out taking into account occurrence probabilities of the transforms inserted into the sub-lists.

In T9, the quantized data are encoded by a known entropy coding technique, as for example Huffman coding, arithmetic coding or still CABAC encoding as used in the HEVC standard.

During a step T10, a data complementary to the initial data of identification of the transform DI is encoded if necessary.

In a particular embodiment of the invention, this step is not implemented. This is the case when the initial transform data comprises only one identifier transform and/or when it has been decided not to report to the decoder that the current block has been added a transform different from that predicted. It is understood that this case is simple, where the decoder is arranged to exclusively apply the transform identified by the initial data.

An advantage of this mode is that it is simple to implement and does not require reporting.

For other embodiments, according to which the sub-lists of transforms related to certain characteristics of the current block comprise more than one element or according to which the decoder should be reported that the applied transform is not part of the predicted sub-list, the step T10 is indeed implemented.

In T10, so we first check whether the transform Tr applied to the current block is part of the sub-list SL. If this is the case and if the sub-list SL contains a single element, the applied transform corresponds to the predicted transform. Advantageously, the decoder is reported that the initial data is a correct prediction of the transform applied, for example by means of a flag-type approach. It consists in encoding conventionally by an entropic or direct binary code a complementary data DC indicating whether the transform indicated by the initial data DI is that of the transform considered (flag=0) or not (flag=1).

If the flag is set to the value 1, then the complementary information is added a code indicating the identifier, for example in the form of an index, of the transformation considered in the initial list L, using a code (entropic or not).

One advantage is that if the transform applied to the current block is indeed predicted, a single bit will be used to report it, unlike the state of the art that explicitly transmits the identifier of the transform.

If the list SL comprises several elements, the initial identification data DI of transform is not sufficient to allow the decoder to determine the transform applied by the encoder.

According to another embodiment of the invention, in T10 is encoded a complementary data DC including a position index POS of the transform applied to the current block in the sub-list SL, SL'. So it is assumed that the sub-list is ordered so that the encoder and the decoder share the knowledge of the positions of the transforms into the sub-list.

By way of example, it is considered that the sub-list determined in T8 contains the transformations {1,4,7}: If an applied transform is the transform 4, the position indicator POS=1, binary coded '01' is transmitted.

One advantage is that if the transferred applied to the current block is well predicted, a few bits to report it in the bit stream will be used, unlike the state of the art that explicitly transmits its full identifier.

When the applied transform is not part of the sub-list SL, SL', the complementary data DC comprises an escape code followed by a complete identifier of the applied transform. It is understood that this reporting is necessarily more expensive than a position index POS in the sub-list. However, the method of selecting the transform by competition ensures that, despite the extra cost, the applied transform is the one that provides the best rate-distortion compromise.

If, for example, the transform considered is the transform 6, which is not part of the specific sub-list, it sends an escape code, for example equal to '11' and a code identifying the transforms 6 is adjoined in the initial list L, eg 0110 which represents 6 in binary form. An unused combination of the code of the position index can be assigned to the escape code. For example, the code 0100 which represents 4 in binary code can be used. This aims to reduce the length of the particular code and thus reduce the flow.

Advantageously, the complementary data DC is then encoded via a binary coding scheme (fixed length, arithmetic or Huffman code), well known to those skilled in the art, so as to minimize the size of the bitstream to be transmitted to the decoder.

During a step T11, the current transform $Tr_i$ of the distortion is estimated, for example in a conventional per se squared error measurement, introduced by the quantization operator.

Advantageously, this evaluation step also comprises:
- an assessment of the number of bits required to transmit the transformed and quantized residue;
- an evaluation is the number of bits required to report the index of the transformation from the result of the encoding T10.

In T12, it is tested whether the current transform $Tr_i$ is the last of the list L. If this is not the last, the index i is incremented by 1 and the steps T3 to T11 are repeated.

If the transform $Tr_i$ is the last in the list, the next stage is the step T13 of selecting a configuration to be transmitted. By configuration is meant the quantized and encoded residual assembly in an entropic manner, thereby reporting the index of transformation by the complementary code. To achieve this selection, a Lagrangian is constructed in accordance with known techniques for each transformation which weighs the corresponding distortion and the rate assembly carried by the residue/complementary reporting. The selection retains the transform with the minimum Lagrangian.

In a step T14, the selected residue and the encoded complementary data associated with the transformation applied to the current block are inserted into a bitstream.

The bitstream TB may then be transmitted to a decoder as a signal.

In connection with FIGS. 8A and 8B, examples of transform reporting applied to the block c according to one embodiment of the invention are presented. In relation to FIG. 8A, a first example is considered, wherein the transform $Tr_i$ applied to the block c is comprised in the specific sub-list SL, SL'. This is the transform $Tr_1$ which occupies the first position in the specific sub-list SL, SL' for the block c. According to the invention, the reporting is limited to a complementary data DC which represents a position index POS of TR1 in the sub-list. For example, for this sub-list of three elements, this index can be encoded on 2 bits by the value 01. Of course, as already mentioned, variable length codes can also be chosen such as Huffman codes or another entropy coder, known to a person having ordinary skill in the art.

In relation to FIG. 8B, a second example is considered, wherein the transform $Tr_i$ applied to the block c is not comprised in the specific sub-list SL, SL'. In other words, the prediction of the transform is not correct. For example, the applied transform is $Tr_6$. In this case, the reported complementary data comprises an escape code, which takes for example the value 11 followed by a code of the complete identifier of the transform $Tr_6$.

As previously described, reporting the identifier of the transform applied according to the specific sub-list SL, SL' can be subjected to an entropy type encoding to improve the compression performances.

The bitstream TB produced by the encoding method according to the invention is for example transmitted as a signal to a decoder via a telecommunications network. This signal is received by a decoder.

It is assumed that the bitstream TB was received by a decoding device implementing a decoding method according to the invention. This decoding method will now be described in connection with FIG. 9.

In D0, the first block to be processed is selected as the current block C'. For example, this is the first block (in lexicographic order). This block comprises M×N pixels, where M and N are non-zero integers.

As described for the encoding process, the block C' considered can be a CTU block or a CU sub-block obtained by cutting the CTU block or a residual block or sub-block obtained by subtracting a prediction block of the current block to the current block.

During a step D1, the encoded data relating to the current block C' is read and decoded. The encoded data comprise encoding parameters, such as for example the prediction mode used, or a reporting of an identifier of the transform applied to the current block and the values of the amplitudes and the signs of the quantized residue coefficients of the current block.

When the determined prediction mode indicates that a prediction has been made by the encoder, the current block is predicted in D2, according to the prediction mode determined from a block already processed. A predicted block Pr' is obtained.

In a step D3, the data read representative of the quantized values, that are residual values of the current block (values and signs of the coefficients), are decoded in the form of a vector of values RQ'. It is understood that this is the reverse operation of the entropy encoding described above in connection with the encoding method.

During a step D4, at least one characteristic of the quantized values decoded is calculated. This calculation, made in accordance with that performed in the encoder, takes into account a criterion for calculation based on the transmitted quantized residue.

In D5, a sub-list SL, SL' of transforms is determined, which transforms are associated with the calculated characteristic value(s).

Several embodiments of the steps D4 and D5 are considered. They correspond to those already described in connection with FIG. 4 for the steps T6 and T7 of the encoding method. They can be combined with each other.

According to a first embodiment of the invention, the position of the last non-zero coefficient of the quantized data of the current block is determined. From this position, an initial identification data of transformation DI comprising one or more transforms is matched, using a table stored in memory Ml. Alternatively, the calculated characteristic is the number of significant coefficients. By way of example, a given threshold number of significant coefficient may use this table in this case to associate with one or more preset transforms.

According to a second embodiment of the invention, the positions of the significant coefficients in the quantized data of the current block are determined. To do so, a word containing '1' for each significant coefficient (that is to say different and non-zero) and '0' for a zero coefficient, is built. For example a signal composed of the values [19, 12,–4,0,18,3,0,–1,0,0] will be allocated a word '1110110100'. Using a table stored in memory, an initial identification data of transformation ID is determined. A given codeword identifies a sub-list SL of the most likely transforms available.

According to a third embodiment, a characteristic data of the sum of the squares or absolute values of the quantized values of the coefficients is calculated. Using a table or a functional matching relationship between, for example intervals of values of the characteristic and of the initial identification data of preset transforms DI, the initial identification data of transformation DI corresponding to a sub-list SL of transforms well adapted to the value of that characteristic is determined from this characteristic data. It shall be noted that the characteristic in question represents an energy carried by the coefficients C' of the current block. For example, the residues carrying an energy beyond a threshold considered will identify a sub-list SL1, while those whose energy is lower than this threshold will identify another SL2.

According to a fourth embodiment, a data characteristic of the evolution of the absolute values or of the squares of the quantized values is calculated. This characteristic value can be obtained by summing the differences in absolute value among the (absolute or squared) consecutive values or by summing a growth indicator (1 if two consecutive values increase in absolute value, and 0 otherwise). The initial identification data of transformation corresponding to a sub-list of well suited transforms is obtained from this characteristic value, using a table.

According to a fifth embodiment, a characteristic of the probability density of the quantized values is estimated. This probability density can be achieved by using the ratio between the sum of the absolute values and the sum of the squares of the quantized values as presented in the publication AES of May 2005 entitled «Near Optimal, Low Complexity Arithmetic Coding for Generalized Gaussian Sources» by Florin Ghido. Once the probability density has been estimated, a lookup table allows to associate an initial identification data of transform representative of a specific sub-list. For example, a given probability density will be associated a given transform.

These embodiments provide various compromises between identification accuracy of the transform/computational complexity of identification.

Advantageously, the tables for accessing the transform(s) of the sub-lists are provided to the decoder in a prior step.

According to another embodiment of the invention, the step D5 for determining the initial transformation data DI or sub-list SL is implemented dynamically, in a manner similar to that described above for the coding method, from previously scores associated with each transform of the list L of transforms available to the encoder and to the decoder for some characteristic values of the residual data of the block. They are stored in the memory of the decoder, for example in a table associating a score to a transform for a value or a range of values of one or more characteristic(s) of the residual signal of the block to be processed.

In yet another embodiment, the step D5 further comprises an insertion in the sub-list SL' of a preset number NB-DT of transforms from blocks already processed. It is then proceeded analogously to that of the encoding, so that the final sub-list SL is identical to the decoder and the encoder.

Two cases are possible at this stage:

In a first case, the sub-lists determined in D5 each comprise a single identifier of a transform and the decoder does not expect any additional reporting. During a step D7, it rebuilds the identifier of the reverse transform to be applied from the single information given by the initial data DI determined in D5.

According to a second case, the decoder is configured to fetch a supplementary reporting of the transform to be applied in the bitstream. During a step D6, it decodes a data DC complementary to the initial data DI determined.

The specific sub-list SL may comprise one or more elements.

If it comprises a single element, the complementary data DC indicates whether the prediction of the transform is correct, that is to say whether to apply the transform of the specific sub-list to the current block.

If the sub-list of transforms for the current block comprises a plurality of elements, the decoder knows the order and the number of transforms it comprises and how the encoder has reported the complementary data in the bitstream.

It decodes in D6 the complementary data DC read from the bitstream TB and determines whether it comprises a position index of the transform to be applied in the sub-list or an escape code intended to indicate that the transform applied by the encoder is not part of the specific sub-list.

If the complementary data DC comprises an escape code, it also comprises a complete identifier of the transform applied, placed after the escape code.

If the initial identifier of transform DI is associated with only a single value, then the complementary data DC indicates whether the choice made by the initial DI is correct.

If the initial transform identifier has several values, then the complementary identifier will indicate, among the possible values, the transform to be used. The identifier will indicate whether the choice made by the encoder is not part of the values indicated by the initial transform identifier. As such, the complementary identifier will comprise a binary code (encoded as entropic or not) specifying the index of transform selected by the encoder.

By way of example, let us consider an initial transform identifier comprising the values (1,3,9) which considers the transforms (1,3,9) of the prediction mode in question are plausible. The complementary identifier, encoded in 2 bits, indicate by the value '00' the transformation 1, by the value '01' the transformation 3 and by '10' the transformation 9. If the complementary identifier has the value '11' then the complementary identifier will be supplemented by an complementary code which will specify the transform selected, among those provisioned for the prediction mode considered, by excluding the three transforms pointed to by the initial identifier.

In D8, the data of the current block C' are dequantized.

In D9, the data of the residual monodimensional vector are reorganized in the current block, according to a reverse process to the scanning of the current block described in the step T5 of FIG. 4.

In a step D10, the transform corresponding to the index of transforms reconstructed in D6 is applied to the data quantized. This transformation corresponds to the reverse transform of that performed in the encoder. The result is then a residual signal r' obtained in the spatial domain.

In a step D11, the block of pixels c' of the decoded image is reconstructed from the block r' obtained and it is integrated to the image ID being decoded. As the block c' is a residual block, it is added a prediction PD' of the current block obtained from a reference image previously processed.

During a step D12, it is tested whether the current block is the last block to be processed by the decoder, given the scanning order previously defined. If so, the decoding process has completed its processing. If not, the next step is the step of selecting the next block D13 and the decoding steps D1 to D12 described above are repeated for the next selected block.

It will be noted that the invention just described, can be implemented using software and/or hardware components. In this context, the terms "module" and "entity" used in this document, can be either a software component or a hardware component or even a set of hardware and/or software, capable of implementing the functions outlined for the module or entity concerned.

In relation to FIG. 10, an example of a simplified material structure of an device 100 for encoding a digital image according to the invention is now represented. The device 100 implements the encoding method according to the invention which has just been described in its different embodiments, in connection with FIG. 4.

For example, the device 100 comprises a processing unit 110, equipped with a processor µ1 and driven by a computer program Pg1 120 stored in a memory 130 and implementing the method according to the invention.

At initialisation, the code instructions of the computer program Pg1 120 are for example loaded into a RAM before being executed by the processor of the processing unit 110. The processor of the processing unit 110 implements the method steps described above, according to the instructions of the computer program 120.

In this embodiment of the invention, the device 100 comprises at least one FRED unit of the current block, a RES unit for obtaining a residue of the current block by subtracting the prediction from the current block.

It comprises moreover a plurality of units arranged for implementation several times for the same block, so that the plurality of transforms available to the encoder can compete. These comprise a unit ID-TRANS identifying a transform to apply to the current block c from a list L of transforms available to the encoder and for example stored as a table in a memory, for example the memory 130, of a frequency transformation unit TRANS of a current block in a transforms block C using the identified transform, of a unit QUANT of quantization of the transformed block, of a SCAN unit in a preset order so as to constitute a monodimensional vector RQ'[j], of a unit ENC RQ encoding the quantized monodimensional vector and of a unit EVAL of evaluating the transform Tri applied according to a rate-distortion criterion. The encoding device according to the invention further comprises a selection unit SEL of the best transform from the results obtained by the unit EVAL for the transforms evaluated. The encoded data from the selected transform are then inserted in the bitstream TB.

According to the invention, the device further comprises a unit CALC for calculating at least one characteristic of the residual signal of the current block, a DET unit determining an initial identification data of a sub-list of transforms associated with said at least one calculated characteristic and a unit of verifying the belonging of the transform applied to the specific sub-list. Optionally, the device comprises a unit ENC TR-ID of encoding the identifier of the selected transform comprising encoding a complementary data of the initial identification data. This unit is designed to be implemented, if necessary, at least as the transform applied is part of the specific sub-list of transforms. For example, the initial identification data of transforms comprising a sub-list SL of transforms is stored as a table in a memory, e.g., the memory 130 or a link to this sub-list. These units are controlled by the processor µ1 of the processing unit 110.

Advantageously, the device 100 can be integrated into a user terminal TU. The device 100 is then arranged to cooperate at least with a module E/R for sending/receiving data of the terminal TU, via which the bitstream TB or the compressed file FC is transmitted via a telecommunications network to a decoding device.

In relation to FIG. 11, we now present an example of a simplified material structure of a decoding device according to the invention. For example, the decoding device 200 comprises a processing unit 210, equipped with a processor µ2 and driven by a computer program Pg2 220 stored in a memory 130 and implementing the decoding method according to the invention, which has just been described in its different embodiments, in connection with FIG. 9.

At initialisation, the code instructions of the computer program Pg2 220 are for example loaded into a RAM before being executed by the processor of the processing unit 210. The processor of the processing unit 210 implements the method steps described above, according to the instructions of the computer program 220.

In this embodiment of the invention, the device 200 comprises at least one unit GET of reading encoded data in the bitstream for the current block, comprising the encoding parameters and the values of the quantized residual coefficients, a unit DEC RES of decoding the coefficients of the current block, transformed and quantized from the data obtained, a unit DEQUANT of dequantizing the decoded coefficients, a unit SCAN-1 of reorganizing the data of the residual monodimensional vector in the current block, a unit TRANS-1 of reverse transformation of the transformed current residual block, a unit RECONST of reconstructing the current block from the residue and from the prediction of the block.

Advantageously, the device comprises in addition a unit CALC for calculating at least one characteristic of the quantized residual signal of the current block and a unit DET for determining an initial identification data representative of a sub-list of at least one transform DI associated with said at least one calculated characteristic. For example, an initial identification data of transforms comprises a sub-list SL of transforms, which is stored as a table in a memory, e.g., the memory 230 or it comprises a link to this sub-list.

These two units are similar to that of an encoding device according to the invention. The decoding device 200 according to the invention further comprises a UNIT REC TR-ID of reconstructing an identifier of the transform applied to the current block, at least from the initial data ID. According to an embodiment of the invention, the device 200 further comprises a unit DEC DC for decoding a complementary data DC read in the bitstream. This complementary data is operated by the reconstruction unit REC TR-ID to determine the identifier of the reverse transform to be applied to the current block from the knowledge of the sub-list of transforms, as previously described in connection with FIG. 9.

These units are controlled by the processor µ2 of the processing unit 210.

Advantageously, the device 200 can be integrated into a user terminal TU. The device 200 is then arranged to cooperate at least with the next module of the terminal TU':
- a E/R module for sending and receiving data via which the bit stream TB or the compressed file FC is received from a telecommunications network;
- A device DISP for reproducing images, for example a terminal monitor, via which the decoded digital image or the series of decoded images is reproduced for a user.

Advantageously, a user terminal TU, TU' may comprise both an apparatus 100 for encoding and an apparatus 200 for decoding according to the invention.

An exemplary embodiment of the invention improves the situation of the prior art.

An exemplary embodiment in particular to overcomes the shortcomings of the prior art.

An exemplary embodiment proposes a solution that improves the compression performances of a digital image encoder, by reducing the volume of data transmitted, without requiring any significant increase in computational and memory resources.

It goes without saying that the embodiments which have been described above have been given by way of purely indicative and non-limiting example, and that many modifications can be easily made by those skilled in the art without departing from the scope of the invention.

What is claimed is:

1. A method for decoding a picture from a bitstream comprising encoded values of coefficients of transformed residual blocks representative of said picture, said method comprising the following, implemented by a decoding device for a current transformed residual block:
   - decoding encoded values of coefficients of the current transformed residual block;
   - calculating a value of a position of the last significant decoded coefficient value of the current transformed residual block;
   - determining a sub-list of transforms based on said calculated value of the position;
   - decoding an identifier identifying a transform within the determined sub-list of transforms; and
   - decoding the current transformed residual block using the transform identified, within the determined sub-list, by the decoded identifier.

2. The method according to claim 1, which further comprises:
   - the decoding device receiving the bitstream from a communication network or from a non-transitory computer-readable medium on which the bitstream is stored and extracting the encoded values of coefficients from the bitstream.

3. A device for decoding a picture from a bitstream comprising encoded values of coefficients of transformed residual blocks representative of said picture, wherein the device comprises:
   - a processor; and
   - a non-transitory computer-readable medium comprising instructions stored thereon, which when executed by the processor configure the device for decoding to perform the following acts implemented for a current transformed residual block:
   - decoding encoded values of coefficients of the current transformed residual block;
   - calculating a value of a position of the last significant decoded coefficient value of the current transformed residual block;
   - determining a sub-list of transforms based on said calculated value of the position;
   - decoding an identifier identifying a transform within the determined sub-list of transforms; and
   - decoding the current transformed residual block using the transform identified, within the determined sub-list, by the identifier.

4. The device according to claim 3, wherein the instructions further configure to the device to:
   - receive the bitstream from a communication network or from a non-transitory computer-readable medium on which the bitstream is stored and extract the encoded values of coefficients from the bitstream.

5. A user terminal comprising the device for decoding a picture according to claim 3.

6. At least one non-transitory computer-readable medium comprising a computer program stored thereon comprising instructions for implementing a method for decoding a picture from a bitstream, when executed by a processor of a decoding device, said bitstream comprising encoded values of coefficients of transformed residual blocks representative of said picture, said method comprising the following, implemented for a current transformed residual block:
   - decoding encoded values of coefficients of the current transformed residual block;
   - calculating a value of a position of the last significant decoded coefficient value of the current transformed residual block;
   - determining a sub-list of transforms based on said calculated value of the position;

decoding an identifier identifying a transform within the determined sub-list of transforms;

decoding the current transformed residual block using the transform identified, within the determined sub-list, by the decoded identifier.

7. The at least one non-transitory computer-readable medium according to claim 6, wherein the method further comprises:

receiving the bitstream from a communication network or from the at least one non-transitory computer-readable medium on which the bitstream is stored and extracting the encoded values of coefficients from the bitstream.

8. The method according to claim 1, wherein the decoded identifier is a position index indicating a position of said identified transform in the determined sub-list.

9. The device according to claim 3, wherein the decoded identifier is a position index indicating a position of said identified transform in the determined sub-list.

10. The at least one non-transitory computer-readable medium according to claim 6, wherein the decoded identifier is a position index indicating a position of said identified transform in the determined sub-list.

\* \* \* \* \*